(12) United States Patent
Chen

(10) Patent No.: US 7,345,710 B2
(45) Date of Patent: Mar. 18, 2008

(54) SYSTEMS AND METHODS FOR PROCESSING COMPOSITE TELEVISION SIGNALS

(75) Inventor: I-Hong Chen, Taoyuan (TW)

(73) Assignee: Mediatek Inc., Hsin-Chu (TW)

( * ) Notice: Subject to any disclaimer, the term of this patent is extended or adjusted under 35 U.S.C. 154(b) by 588 days.

(21) Appl. No.: 11/052,555

(22) Filed: Feb. 7, 2005

(65) Prior Publication Data

US 2006/0176405 A1    Aug. 10, 2006

(51) Int. Cl.
H04N 9/64    (2006.01)
(52) U.S. Cl. .................................. 348/609
(58) Field of Classification Search ............... 348/609, 348/663, 624, 533, 606, 607, 611, 618, 638
See application file for complete search history.

(56) References Cited

U.S. PATENT DOCUMENTS

| | | | | |
|---|---|---|---|---|
| 4,484,216 A | * | 11/1984 | Rumland | 348/609 |
| 4,706,112 A | * | 11/1987 | Faroudja et al. | 348/669 |
| 4,754,322 A | * | 6/1988 | Okuda et al. | 348/669 |
| 4,864,389 A | * | 9/1989 | Faroudja et al. | 348/670 |
| 5,019,895 A | * | 5/1991 | Yamamoto et al. | 348/609 |
| 5,027,194 A | * | 6/1991 | Scheffler | 348/609 |
| 5,099,329 A | * | 3/1992 | Oyama et al. | 348/620 |
| 5,260,775 A | * | 11/1993 | Farouda | 348/619 |
| 5,305,120 A | * | 4/1994 | Faroudja | 348/624 |
| 5,448,305 A | * | 9/1995 | Hagino | 348/665 |
| 5,909,255 A | * | 6/1999 | Hatano | 348/663 |
| 6,504,579 B1 | | 1/2003 | Scherrer | 348/667 |
| 6,914,638 B2 | * | 7/2005 | Tsui | 348/663 |
| 6,956,620 B2 | * | 10/2005 | Na | 348/663 |
| 7,084,928 B2 | * | 8/2006 | Tanigawa | 348/663 |
| 7,280,159 B2 | * | 10/2007 | Chao | 348/609 |
| 2004/0119892 A1 | * | 6/2004 | Ishihara | 348/663 |

* cited by examiner

Primary Examiner—Paulos M. Natnael
(74) Attorney, Agent, or Firm—Thomas, Kayden, Horstemeyer & Risley

(57) ABSTRACT

Signal processing methods and systems for cross-color suppression. A chrominance signal extracted from a composite TV signal by s Y/C separator is provided to a chroma demodulator to produce a baseband chrominance signal. A chroma regulator regulates the baseband chrominance signal to obtain a regulated baseband chrominance signal. The baseband chrominance signal and the regulated baseband chrominance signal are provided to a chroma mixer to determine a final chrominance signal. The chroma mixer determines the final chrominance signal according to image similarity calculated by an image similarity calculator.

54 Claims, 7 Drawing Sheets

SYSTEMS AND METHODS FOR PROCESSING COMPOSITE TELEVISION SIGNALS

BACKGROUND

The invention relates to signal processing for composite television signals.

Color information carried by a composite television (TV) signal is modulated in quadrature upon a subcarrier. The subcarrier has a frequency corresponding to the line scan frequency in a manner that interleaves the color information about the subcarrier between energy spectra of the luminance baseband signal. In color television systems such as NTSC and PAL, the color information comprises luminance (Y) and chrominance (C) information sharing a portion of the total signal bandwidth. Thus, a Y/C separation procedure in the receiving end is required to extract the luminance and chrominance information individually. The luminance and chrominance information of some image areas, especially in image areas such as a motion edge of high frequency luminance, may not be distinguishable due to imperfect encoding techniques. For example, a television demodulator may incorrectly demodulate high frequency luminance information as chrominance information, causing color artifacts on vertical edges. These include color ringing, color smearing, and the display of color rainbows in place of high-frequency gray-scale information.

Control methods and systems for suppressing cross-color artifacts from a quadrature modulated composite television signal are receiving much attention. Examples of cross-color suppression methods are disclosed in U.S. Pat. Nos. 5,305,120, and 6,504,579. In U.S. Pat. No. 5,305,120, cross-color is suppressed in response to motion information, wherein temporal averaging is employed for cross-color suppression. Alternatively, if motion is detected in the television signals, spatial averaging is employed. Comb filtering also is a popular Y/C separation technique for suppressing cross-color artifacts. Unfortunately, typically not all undesirable cross-color artifacts are removed using comb filter processing. In U.S. Pat. No. 6,504,579, Remy Scherrer discloses adopting a horizontal image gradient, a vertical image gradient, and a diagonal image gradient to determine which direction should have greater weighting in comb filtering in an effort to improve performance.

SUMMARY

Signal processing methods and systems for cross-color suppression in a composite TV signal are provided. An exemplary embodiment of a signal processing method comprises calculating image similarity of the composite TV signal, extracting a luminance signal (Y) and a chrominance signal (C) from the composite TV signal, demodulating the chrominance signal (C) to obtain a baseband chrominance signal (U1,V1), and regulating the baseband chrominance signal (U1,V1) to obtain a regulated baseband chrominance signal (U2,V2). The baseband chrominance signal (U1,V1) and the regulated baseband chrominance signal (U2,V2) are provided to calculate a final chrominance signal (U,V) according to the image similarity.

An exemplary embodiment of a signal processing system comprises an image similarity calculator, a Y/C separator, a chroma demodulator, a chroma regulator, and a chroma mixer. The image similarity calculator calculates image similarity of the composite TV signal. The Y/C separator distinguishes color information carried by the composite TV signal and extracts a luminance signal (Y) and a chrominance signal (C). The chroma demodulator demodulates the chrominance signal (C) to obtain a baseband chrominance signal (U1,V1). The chroma regulator regulates the baseband chrominance signal (U1,V1) to obtain a regulated baseband chrominance signal (U2,V2). The chroma mixer calculates a final chrominance signal (U,V) from the baseband chrominance signal (U1,V1) and the regulated baseband chrominance signal (U2,V2) according to the image similarity. In some embodiments, the signal processing system further comprises a similarity mapping table outputting a variation coefficient K to the chroma mixer in accordance with the image similarity calculated by the image similarity calculator, such that the chroma mixer calculates the final chrominance signal (U,V) based on the variation coefficient K.

Another embodiment of a signal processing method comprises calculating image similarity according to the composite TV signal, extracting a luminance signal (Y) and a chrominance signal (C) from the composite TV signal, and demodulating the chrominance signal (C) to obtain a baseband chrominance signal (U1,V1). A regulated chrominance signal (C2) is obtained by regulating the chrominance signal (C), and a regulated baseband chrominance signal (U3,V3) is obtained by demodulating the regulated chrominance signal (C2). A final chrominance signal (U,V) is consequently calculated from the baseband chrominance signal (U1,V1) and the regulated chrominance signal (U3,V3) according to the image similarity.

Another embodiment of a signal processing system comprises an image similarity calculator, a Y/C separator, a first and a second chroma demodulator, a chroma regulator, and a chroma mixer. The image similarity calculator calculates image similarity of the composite TV signal, and the Y/C separator extracts a luminance signal (Y) and a chrominance signal (C) from the composite TV signal. The first chroma demodulator demodulates the chrominance signal (C) to obtain a baseband chrominance signal (U1,V1). The chroma regulator regulates the chrominance signal (C) to obtain a regulated chrominance signal (C2), and the second chroma demodulator demodulates the regulated chrominance signal (C2) to obtain a regulated baseband chrominance signal (U3,V3). The chroma mixer calculates a final chrominance signal (U,V) from the baseband chrominance signal (U1,V1) and the regulated baseband chrominance signal (U3,V3) according to the image similarity.

DESCRIPTION OF THE DRAWINGS

The invention can be more fully understood by reading the subsequent detailed description in conjunction with the examples and references made to the accompanying drawings, wherein.

DETAILED DESCRIPTION

Signal processing methods and systems for cross-color suppression are provided. The cross-color artifacts are suppressed by detecting image areas where similarity measures in the Y/C separation process are small, that is, where both 2 dimensional (2D) and 3 dimensional (3D) Y/C separation fail. The similarity measurements for a particular image area comprise similarity of horizontal, vertical, and temporal dimensions. Cross-color suppression is achieved by varying the chrominance information at image areas where cross-color is likely to occur.

Figure 1:
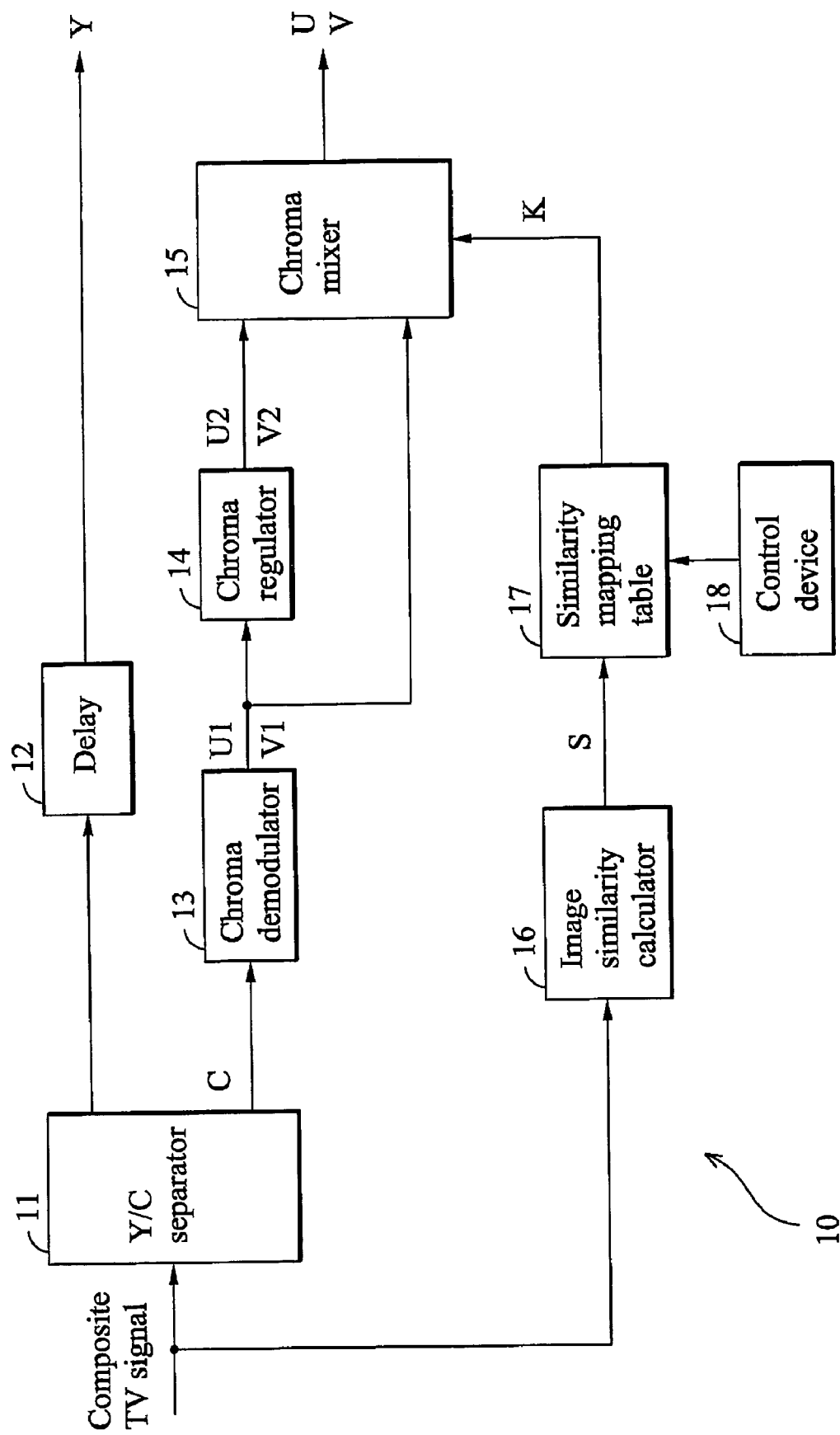
FIG. 1 is a schematic diagram illustrating an embodiment of a signal processing system for cross-color suppression.

FIG. 1 is a schematic diagram illustrating an embodiment of a signal processing system 10 for cross-color suppression. A composite TV signal is provided to a Y/C separator 11 to extract a luminance signal (Y) and a chrominance signal (C). A baseband chrominance signal (U1,V1) is obtained by demodulating the chrominance signal (C) in a chroma demodulator 13, and is provided to a chroma regulator 14 and a chroma mixer 15. The chroma regulator 14 varies the baseband chrominance signal (U1,V1) to generate a regulated baseband chrominance signal (U2,V2). In some embodiments, the chroma regulator reduces the signal strength of the baseband chrominance signal (U1,V1), for example, reducing the amplitude of the baseband chrominance signal (U1,V1) to half or a quarter. The chroma regulator can further vary the baseband chrominance signal (U1,V1) by filtering. The chroma regulator 14 may obtain the regulated baseband chrominance signal (U2,V2) by averaging samples of the baseband chrominance signal (U1,V1) spaced a predetermined number of lines apart, or a predetermined number of frames apart. The spatial or temporal averaging procedure may effectively suppress the signal strength of the baseband chrominance signal (U1,V1).

An image similarity calculator 16 receives the composite TV signal for calculation of image similarity S based on spatial and temporal correlations of samples of the composite TV signal. The spatial correlation is a correlation of the samples spaced a predetermined number of horizontal or vertical lines apart, and the temporal correlation is a correlation of the samples spaced a predetermined number of frames apart. The image similarity calculator 16 outputs a small image similarity S only if both the spatial and temporal correlations fall below a threshold, indicating likelihood of cross-color occurring. A corresponding variation coefficient K is found from a similarity mapping table 17 in response to image similarity S calculated and provided by the image similarity calculator 16. The similarity mapping table can store a set of variation coefficients, each corresponding to image similarity or a range of image similarity. A small degree of image similarity corresponds to a large variation coefficient, and a large degree of image similarity corresponds to a small variation coefficient. The content of the similarity mapping table 17 may be managed and programmed by a control device 18.

A chroma mixer 15 receives the baseband chrominance signal (U1,V1), and the regulated baseband chrominance signal (U2,V2) from the chroma demodulator 13 and chroma regulator 14 respectively, and the variation coefficient K from the similarity mapping table 17. The chroma mixer 15 determines a final chrominance signal (U,V) according to input. The chroma mixer 15 can be implemented by a multiplexer, which selects the baseband chrominance signal (U1,V1) if the variation coefficient K is less than a preset threshold, indicating the similarity of at least one direction exceeding a threshold, or selecting the regulated baseband chrominance signal (U2,V2). In some embodiments, the chroma mixer 15 calculates the final chrominance signal (U,V) by mixing the baseband chrominance signal (U1,V1) and the regulated baseband chrominance signal (U2,V2) with a weighting factor equivalent to the variation coefficient K, which can be described by the following equations:

$$U=K\times U2+(1-K)\times U1;$$

$$V=K\times V2+(1-K)\times V1.$$

The regulated baseband chrominance signal (U2,V2) dominates the final chrominance signal (U,V) if K is large, indicating the similarity of all directions being less than the threshold. The baseband chrominance signal (U1,V1) dominates the final chrominance signal (U,V) if K is small, indicating the similarity of at least one direction exceeding the threshold.

The luminance signal output from the Y/C separator 11 is provided to a delay unit 12 to match and compensate for the time required to calculate the final chrominance signal (U,V).

Figure 2:
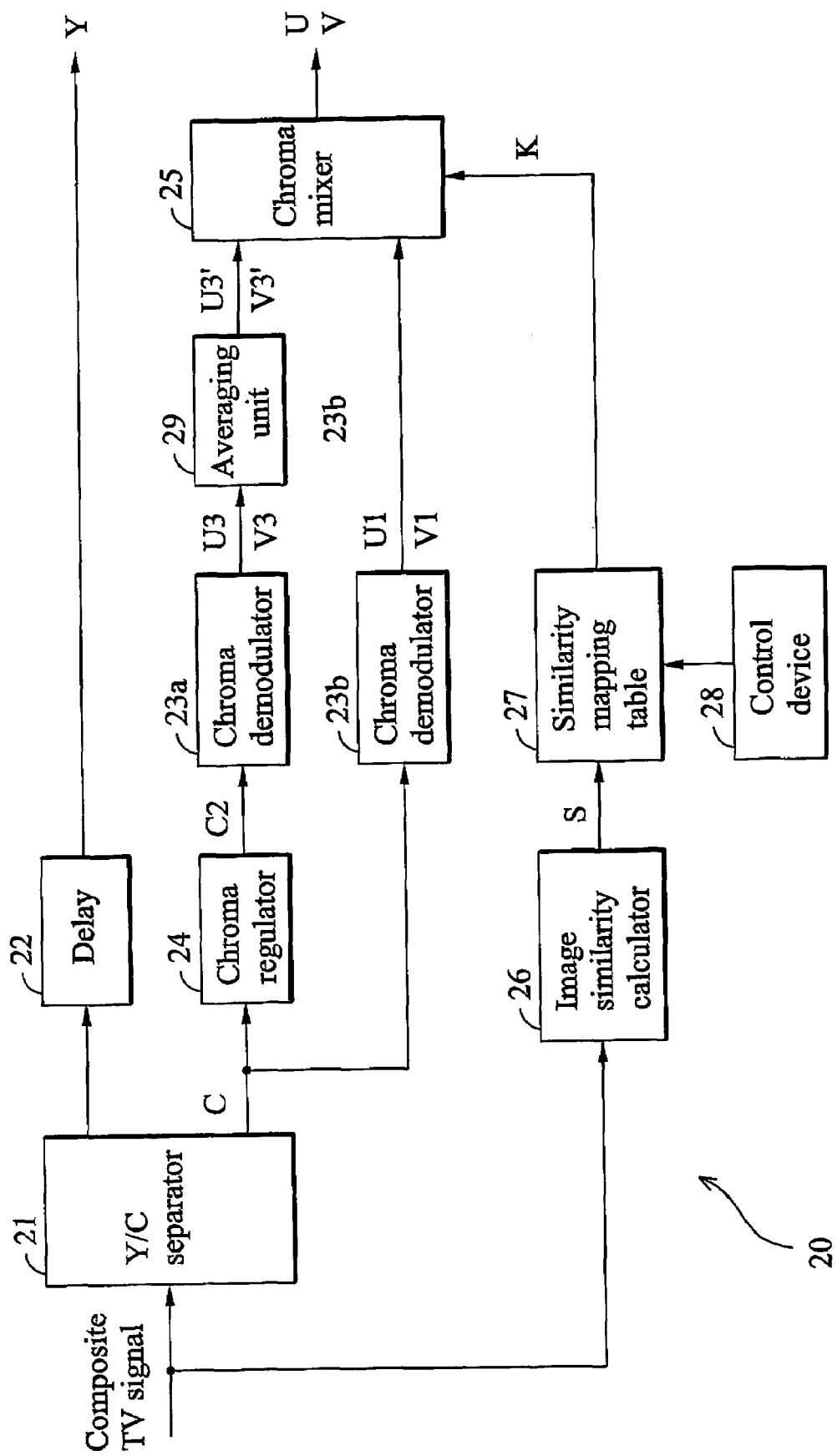
FIG. 2 is a schematic diagram illustrating an embodiment of a signal processing system for cross-color suppression.

FIG. 2 shows another embodiment of a signal processing system 20 for cross-color suppression. The signal processing system 20 of FIG. 2 is similar to the system 10 in FIG. 1, except that a chroma regulator 24 regulates the chrominance signal before demodulation. A Y/C separator 21 extracts a luminance signal (Y) and a chrominance signal (C) from a composite TV signal, and the chroma regulator 24 generates a regulated chrominance signal (C2) by reducing the signal strength of the chrominance signal (C). The regulated chrominance signal (C2) is then provided to a chroma demodulator 23a to generate a regulated baseband chrominance signal (U3,V3). Furthermore, the chrominance signal (C) is directly provided to another chroma demodulator 23b to generate a baseband chrominance signal (U1,V1).

An image similarity calculator 26 computes image similarity S of the composite TV signal, and a similarity mapping table 27 outputs a variation coefficient K to a chroma mixer 25 in response to receipt of image similarity S. A control device 28 is capable of changing the content of the similarity mapping table 27. An averaging unit 29 is disposed between the chroma demodulator 23a and the chroma mixer 25. The averaging unit 29 averages the regulated baseband chrominance signal (U3,V3) using samples spaced a predetermined number of lines or frames apart.

The chroma mixer 25 receives the baseband chrominance signal (U1,V1) and the averaged baseband chrominance signal (U3',V3'), and generates a final chrominance signal (U,V) according to the variation coefficient K. In this regard, the final chrominance signal (U,V) is given by:

$$U=K\times U3'+(1-K)\times U1;$$

$$V=K\times V3'+(1-K)\times V1.$$

The signal processing system of FIG. 2 consequently outputs the final chrominance signal (U,V) with the luminance signal (Y). The luminance signal (Y) is buffered in a delay unit 22 to match the time spent generating the final chrominance signal (U,V).

Alternatively, the regulated chrominance signal (U3,V3) can be directly sent to the chroma mixer 25. The chroma mixer 25 receives the baseband chrominance signal (U1,V1) and the regulated baseband chrominance signal (U3,V3), and generates a final chrominance signal (U,V) according to the variation coefficient K. In this regard, the final chrominance signal (U,V) is given by:

$$U=K\times U3+(1-K)\times U1;$$

$$V=K\times V3+(1-K)\times V1.$$

Figure 3A:
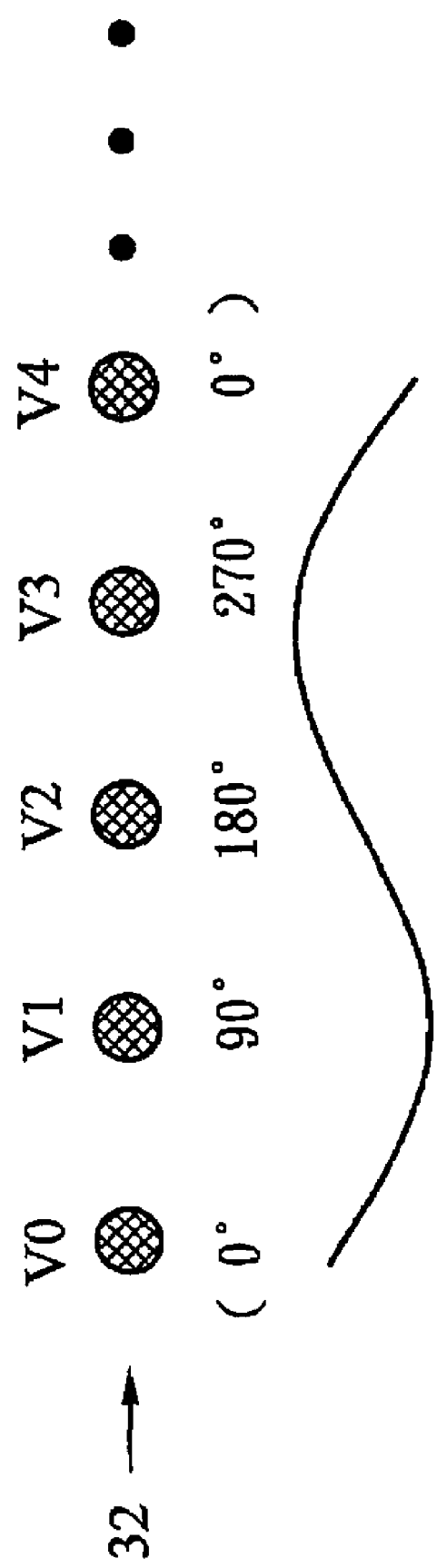
FIGS. 3a~3d illustrate determining spatial and temporal correlations for a particular composite TV signal sample in accordance with an embodiment.
Figure 3B:
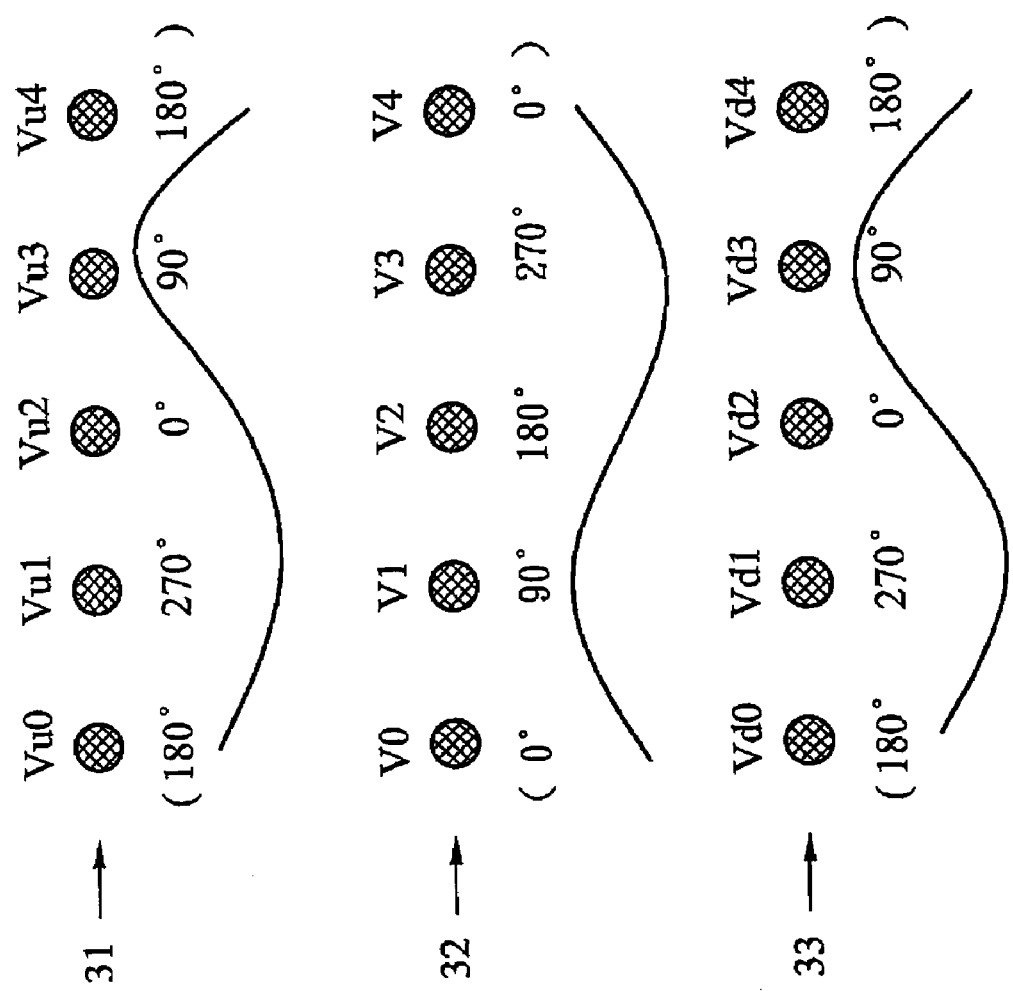

Image similarity may be calculated by spatial and/or temporal correlations. FIGS. 3a~3d illustrate determination of spatial and temporal correlations for an exemplary composite TV signal sample, digitized here by sampling at four times the subcarrier frequency (sampling frequency□4× subcarrier frequency). FIG. 3a shows the waveform of a composite TV signal and the corresponding composite TV signal samples V0, V1, V2 . . . , sampled at four times the subcarrier frequency. FIG. 3b shows three lines 31~33 of horizontal composite TV signal samples, including a current line 32, an upper line 31, and a lower line 33. The phase of each line in the composite TV signal is out of phase (180 degree phase shift) to an upper and a lower line.

Figure 3C:
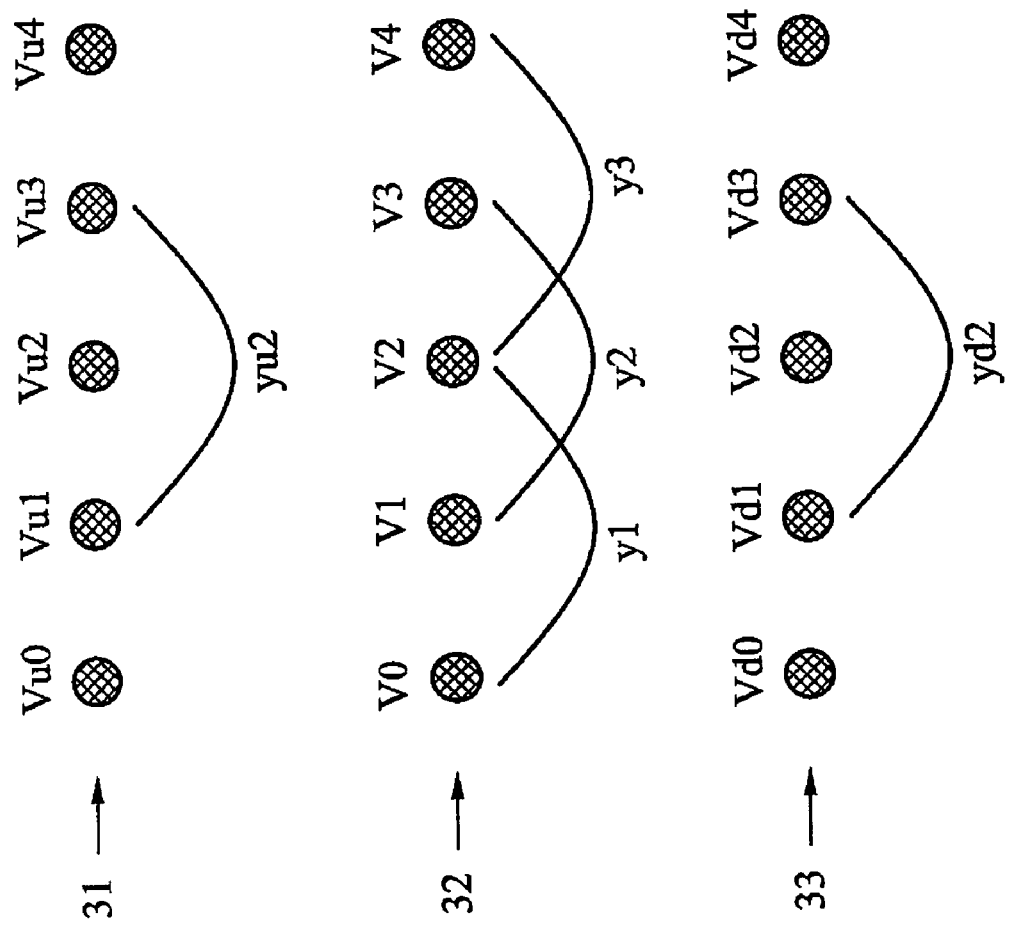

FIG. 3c illustrates an exemplary procedure for determining whether spatial correlation exists in a particular composite TV sample V2 in the current line 32. A left horizontal difference LYD is an absolute difference between averages y1 and y2, wherein y1 is the average of samples V0 and V2, and y2 is the average of samples V1 and V3, as set forth in the following:

$LYD$=absolute $(y1-y2)$;

$y1=(V0+V2)/2$;

$y2=(V1+V3)/2$.

The left correlation of the particular sample V2 exists if the left horizontal difference LYD is less than a preset threshold.

A right horizontal difference RYD is an absolute difference between averages y3 and y2, wherein y3 is the average of samples V2 and V4, as set forth in the following:

$RYD$=absolute $(y3-y2)$;

$Y3=(V2+V4)/2$.

The right correlation of the particular sample V2 exists if the right horizontal difference RYD is less than a preset threshold.

An up vertical difference UYD is an absolute difference between averages yu2 and y2, wherein yu2 is the average of samples Vu1 and Vu3 in the upper line 41, as set forth in the following:

$UYD$=absolute $(yu2-y2)$ $yu2=(Vu1+Vu3)/2$.

The upper correlation of the particular sample V2 exists if the up vertical difference UYD is less than a preset threshold.

A down vertical difference DYD is an absolute difference between averages yd2 and y2, wherein yd2 is the average of samples Vd1 and Vd3 in the lower line 33, as set forth in the following:

$DYD$=absolute $(yd2-y2)$ $yd2=(Vd1+Vd3)/2$.

The lower correlation of the particular sample V2 exists if the down vertical difference DYD is less than a preset threshold. The spatial correlation for the particular sample V2 does not occur if none of the left, right, upper, or lower correlation exists.

Figure 3D:
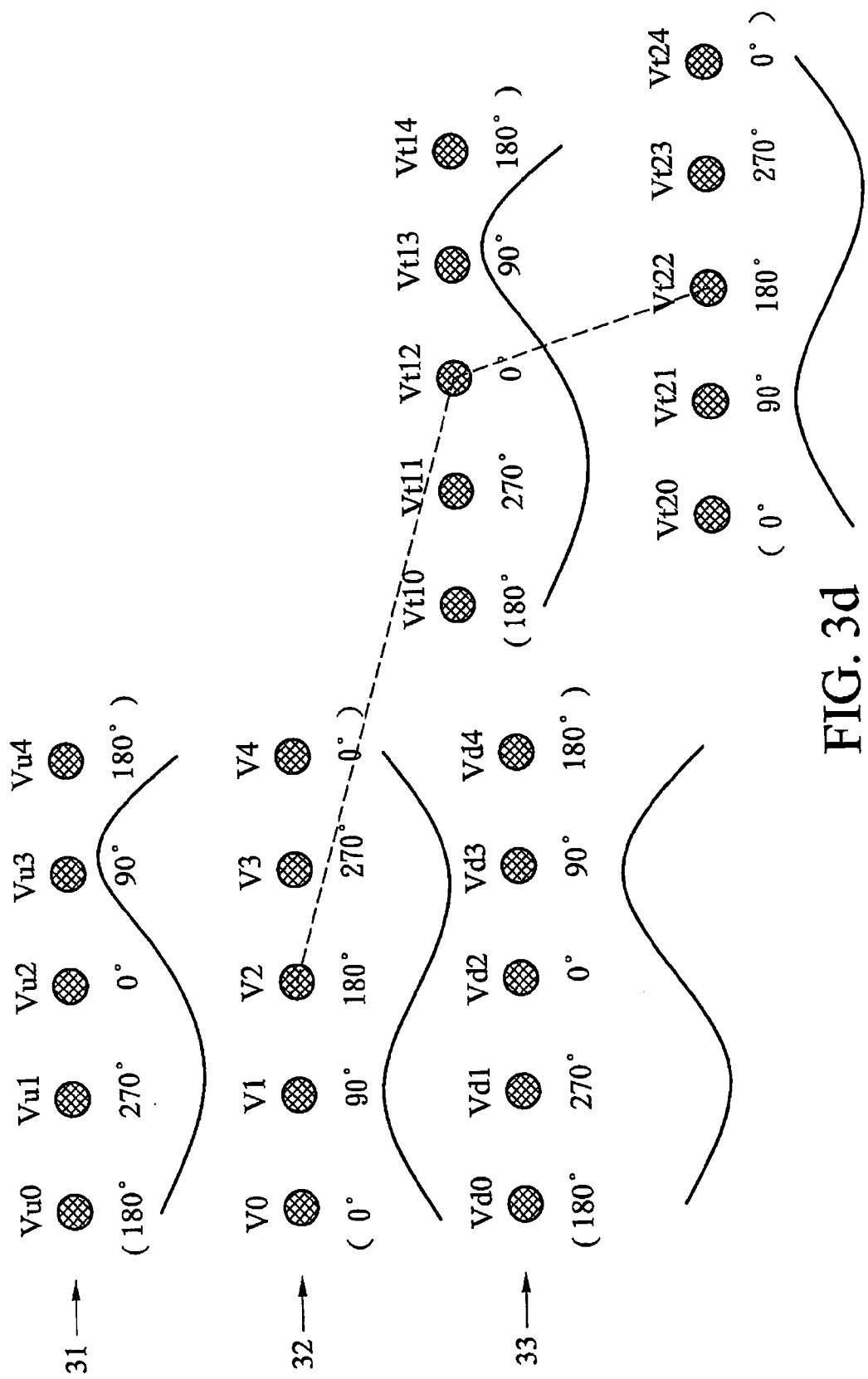

FIG. 3d illustrates an exemplary procedure for determining whether a temporal correlation exists in a particular composite TV sample V2 in the current line 32. Samples Vt10~Vt14 and Vt20~Vt24 are located in the two previous frames in the same position as the samples V0~V4 in the current frame. A temporal difference TD is an absolute difference between averages ty1 and ty2, wherein ty1 is the average of samples Vt2 and Vt12, and ty2 is the average of samples Vt12 and Vt22. The temporal correlation of the particular sample V2 exists if the temporal difference TD is less than a preset threshold. If none of the spatial or temporal correlation exists, the signal processing system determines that sample V2 requires cross-color suppression because a cross-color artifact may occur if correlations of all directions are relatively small. The image similarity of left, right, up, down, and temporal directions may be the inverse of the calculated differences LYD, RYD, UYD, DYD, and TD respectively.

Figure 4:
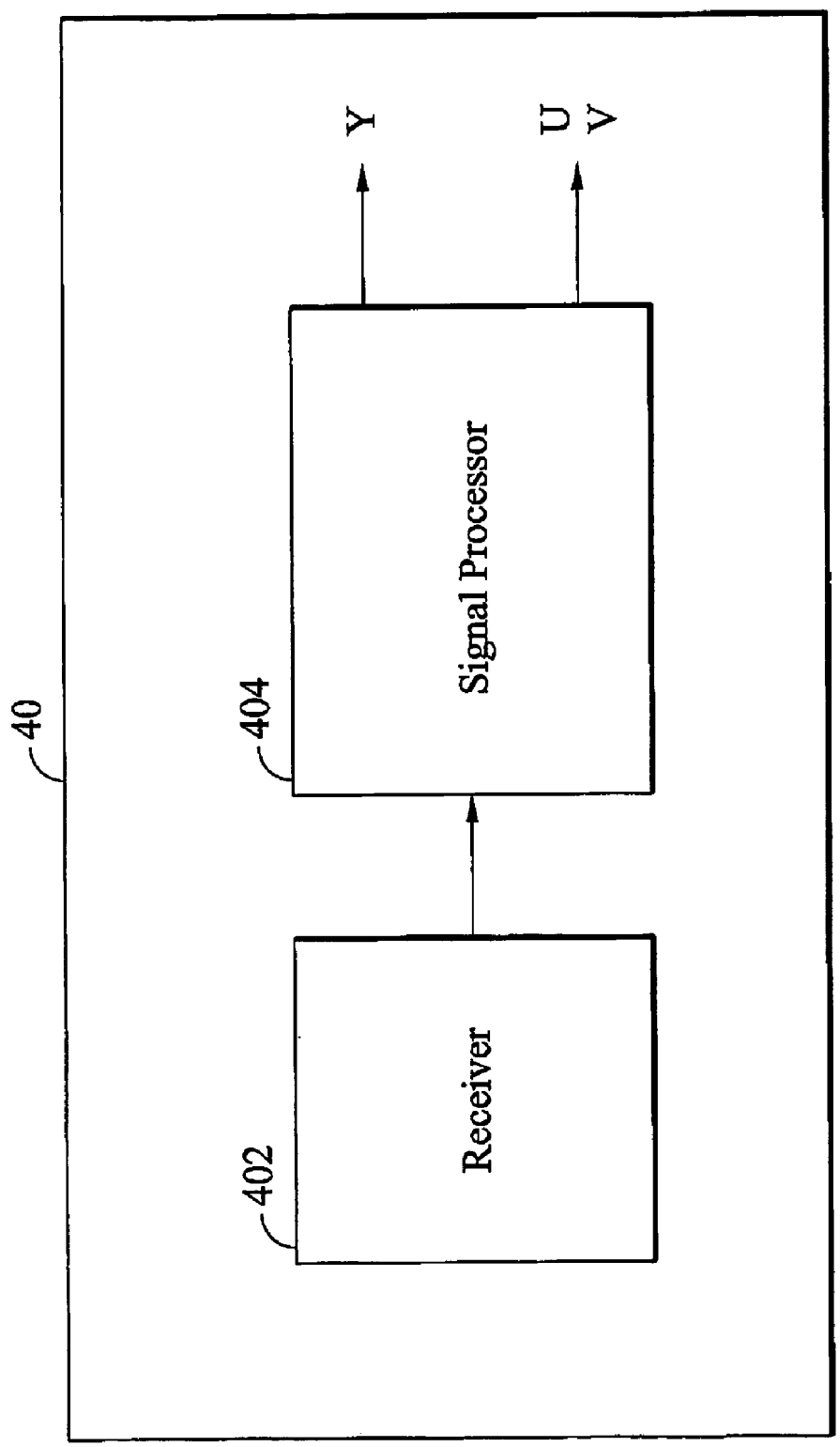
FIG. 4 is a block diagram illustrating an embodiment of a television.

FIG. 4 is a block diagram illustrating an embodiment of a television 40 comprising a signal processor 404 for cross-color suppression. The signal processor 404 receives a composite TV signal from a TV receiver 402, calculates image similarity of the composite TV signal, extracts a luminance signal (Y) and a chrominance signal (C) from the composite TV signal, and calculating a final chrominance signal (U,V) according to image similarity. The effort of cross-color suppression applied to the final chrominance signal (U,V) is inversely proportional to image similarity of the composite TV signal. The signal processor 404 in the television 40 can be implemented by the signal processing systems 10 and 20 shown in FIGS. 1 and 2 respectively.

While the invention has been described by way of example and in terms of preferred embodiment, it is to be understood that the invention is not limited thereto. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A signal processing method for a composite television (TV) signal comprising:

calculating image similarity of samples of the composite TV signal, wherein the image similarity is calculated based on spatial and temporal correlations of the samples from the composite TV signal;

extracting a luminance signal (Y) and a chrominance signal (C) from the composite TV signal;

demodulating the chrominance signal (C) to obtain a baseband chrominance signal (U1,V1);

regulating the baseband chrominance signal (U1,V1) to obtain a regulated baseband chrominance signal (U2, V2); and calculating a final chrominance signal (U,V) from the baseband chrominance signal (U1,V1) and the regulated baseband chrominance signal (U2,V2) according to the image similarity.

2. The signal processing method according to claim 1, further comprising acquiring a variation coefficient K from a similarity mapping table according to the degree of image similarity calculated, and determining the final chrominance signal (U,V) based on the variation coefficient K.

3. The signal processing method according to claim 2, wherein the mapping table is programmable.

4. The signal processing method according to claim 2, wherein the final chrominance signal (U,V) is calculated by combining the baseband chrominance signal (U1,V1) and the regulated baseband chrominance signal (U2,V2) with a weighting factor equivalent to the variation coefficient K, as follows:

$$U=K \times U2+(1-K) \times U1, \quad V=K \times V2+(1-K) \times V1.$$

5. The signal processing method according to claim 1, wherein the final chrominance signal (U,V) equals the baseband chrominance signal (U1,V1) if the image similarity exceeds a preset threshold.

6. The signal processing method according to claim 1, wherein the final chrominance signal (U,V) equals the regulated baseband chrominance signal (U2,V2) if the image similarity does not exceed a preset threshold.

7. The signal processing method according to claim 1, wherein the regulated baseband chrominance signal (U2,V2) is obtained by reducing the amplitude of the baseband chrominance signal (U1,V1).

8. The signal processing method according to claim 1, wherein the regulated baseband chrominance signal (U2,V2) is obtained by averaging samples of the baseband chrominance signal (U1,V1) spaced a predetermined number of lines apart.

9. The signal processing method according to claim 1, wherein the regulated baseband chrominance signal (U2,V2) is obtained by averaging samples of the baseband chrominance signal (U1,V1) spaced a predetermined number of frames apart.

10. The signal processing method according to claim 1, wherein the spatial correlation is a correlation of the samples spaced a predetermined number of horizontal or vertical lines apart, and the temporal correlation is a correlation of the samples spaced a predetermined number of frames apart.

11. The signal processing method according to claim 10, wherein the image similarity is less than a preset threshold only if both the spatial and temporal correlations fall below a correlation threshold.

12. A signal processing system for a composite television (TV) signal comprising:
an image similarity calculator, operative to calculate image similarity of the composite TV signal, wherein the image similarity is calculated based on spatial and temporal correlations of samples of the composite TV signal;
a Y/C separator, operative to extract a luminance signal (Y) and a chrominance signal (C) from the composite TV signal;
a chroma demodulator, operative to demodulate the chrominance signal (C) to obtain a baseband chrominance signal (U1,V1);
a chroma regulator, operative to regulate the baseband chrominance signal (U1,V1) to obtain a regulated baseband chrominance signal (U2,V2); and
a chroma mixer, operative to calculate a final chrominance signal (U,V) from the baseband chrominance signal (U1,V1) and the regulated baseband chrominance signal (U2,V2) according to the image similarity.

13. The signal processing system according to claim 12, further comprising a similarity mapping table coupled to the image similarity calculator, and operative to output a variation coefficient K to the chroma mixer in accordance with the degree of image similarity calculated by the image similarity calculator, and wherein the chroma mixer calculates the final chrominance signal (U,V) based on the variation coefficient K.

14. The signal processing system according to claim 13, further comprising a control device operative to manage contents of the similarity mapping table.

15. The signal processing system according to claim 13, wherein the chroma mixer is operative to calculate the final chrominance signal (U,V) by combining the baseband chrominance signal (U1,V1) and the regulated baseband chrominance signal (U2,V2) with a weighting factor equivalent to the variation coefficient K, as follows:

$$U=K \times U2+(1-K) \times U1,$$

$$V=K \times V2+(1-K) \times V1.$$

16. The signal processing system according to claim 12, wherein the chroma mixer is operative to output the baseband chrominance signal (U1,V1) as the final chrominance signal (U,V) if the image similarity exceeds a preset threshold.

17. The signal processing system according to claim 12, wherein the chroma mixer is operative to output the regulated baseband chrominance signal (U2,V2) as the final chrominance signal (U,V) if the image similarity does not exceed a preset threshold.

18. The signal processing system according to claim 12, wherein the chroma regulator is operative to obtain the regulated baseband chrominance signal (U2,V2) by reducing the amplitude of the baseband chrominance signal (U1,V1) output from the chroma demodulator.

19. The signal processing system according to claim 12, wherein the chroma regulator is operative to obtain the regulated baseband chrominance signal (U2,V2) by averaging samples of the baseband chrominance signal (U1,V1) spaced a predetermined number of lines apart.

20. The signal processing system according to claim 12, wherein the chroma regulator is operative to obtain the regulated baseband chrominance signal (U2,V2) by averaging samples of the baseband chrominance signal (U1,V1) spaced a predetermined number of frames apart.

21. The signal processing system according to claim 12, wherein the spatial correlation is a correlation of the samples spaced at least one of a predetermined number of horizontal line and a predetermined number of vertical line apart, and the temporal correlation is a correlation of the samples spaced a predetermined number of frames apart.

22. The signal processing system according to claim 21, wherein the image similarity calculator outputs the image similarity less than a preset threshold only if both the spatial and temporal correlations fall below a correlation threshold.

23. A signal processing method for a composite television (TV) signal comprising:
calculating image similarity of the composite TV signal, wherein the image similarity is calculated based on spatial and temporal correlations of samples of the composite TV signal;
extracting a luminance signal (Y) and a chrominance signal (C) from the composite TV signal;
demodulating the chrominance signal (C) to obtain a baseband chrominance signal (U1,V1);
regulating the chrominance signal (C) to obtain a regulated chrominance signal (C2);
demodulating the regulated chrominance signal (C2) to obtain a regulated baseband chrominance signal (U3, V3); and
calculating a final chrominance signal (U,V) from the baseband chrominance signal (U1,V1) and the regulated chrominance signal (U3,V3) according to the image similarity.

24. The signal processing method according to claim 23, further comprising acquiring a variation coefficient K according to the degree of image similarity calculated, and determining the final chrominance signal (U,V) based on the variation coefficient K.

25. The signal processing method according to claim 24, wherein the final chrominance signal (U,V) is calculated by combining the baseband chrominance signal (U1,V1) and the regulated baseband chrominance signal (U3,V3) with a weighting factor equivalent to the variation coefficient K, as follows:

$$U=K\times U3+(1-K)\times U1, \quad V=K\times V3+(1-K)\times V1.$$

26. The signal processing method according to claim 23, wherein the final chrominance signal (U,V) equals the baseband chrominance signal (U1,V1) if the image similarity exceeds a preset threshold.

27. The signal processing method according to claim 23, wherein the final chrominance signal (U,V) equals the regulated baseband chrominance signal (U3,V3) if the image similarity does not exceed a preset threshold.

28. The signal processing method according to claim 23, wherein the regulated chrominance signal (C2) is obtained by reducing the amplitude of the chrominance signal (C).

29. The signal processing method according to claim 23, further comprising averaging samples of the regulated baseband chrominance signal (U3,V3), wherein the samples are spaced a predetermined number of lines apart.

30. The signal processing method according to claim 23, further comprising averaging samples of the regulated baseband chrominance signal (U3,V3), wherein the samples are spaced a predetermined number of frames apart.

31. The signal processing method according to claim 23, wherein the spatial correlation is a correlation of the samples spaced a predetermined number of horizontal or vertical lines apart, and the temporal correlation is a correlation of the samples spaced a predetermined number of frames apart.

32. The signal processing method according to claim 31, wherein the image similarity is less than a preset threshold only if both the spatial and temporal correlations fall below a correlation threshold.

33. A signal processing system for a composite television (TV) signal comprising:
  an image similarity calculator, operative to calculate image similarity of the composite TV signal, wherein the image similarity is calculated based on spatial and temporal correlations of samples of the composite TV signal;
  a Y/C separator, operative to extract a luminance signal (Y) and a chrominance signal (C) from the composite TV signal;
  a first chroma demodulator, operative to demodulate the chrominance signal (C) to obtain a baseband chrominance signal (U1,V1);
  a chroma regulator, operative to regulate the chrominance signal (C) to obtain a regulated chrominance signal (C2);
  a second chroma demodulator, operative to demodulate the regulated chrominance signal (C2) to obtain a regulated baseband chrominance signal (U3,V3); and
  a chroma mixer, operative to calculate a final chrominance signal (U,V) from the baseband chrominance signal (U1,V1) and the regulated baseband chrominance signal (U3,V3) according to the image similarity.

34. The signal processing system according to claim 33, further comprising a similarity mapping table coupled to the image similarity calculator, outputting a variation coefficient K to the chroma mixer in accordance with the degree of image similarity calculated by the image similarity calculator, and wherein the chroma mixer calculates the final chrominance signal (U,V) based on the variation coefficient K.

35. The signal processing system according to claim 34, further comprising a control device operative to manage contents of the similarity mapping table.

36. The signal processing system according to claim 34, wherein the chroma mixer calculates the final chrominance signal (U,V) by mixing the baseband chrominance signal (U1,V1) and the regulated baseband chrominance signal (U3,V3) with a weighting factor equivalent to the variation coefficient K, as follows:

$$U=K\times U3+(1-K)\times U1, \quad V=K\times V3+(1-K)\times V1.$$

37. The signal processing system according to claim 33, wherein the chroma mixer outputs the baseband chrominance signal (U1,V1) as the final chrominance signal (U,V) if the image similarity exceeds a preset threshold.

38. The signal processing system according to claim 33, wherein the chroma mixer outputs the regulated baseband chrominance signal (U3,V3) if the image similarity does not exceed a preset threshold.

39. The signal processing system according to claim 33, wherein the chroma regulator obtains the regulated chrominance signal (C2) by reducing the amplitude of the chrominance signal (C) output from the Y/C separator.

40. The signal processing system according to claim 33, further comprising an averaging unit coupled to the second chroma demodulator, averaging samples of the regulated baseband chrominance signal (U3,V3), wherein the samples are spaced a predetermined number of lines apart.

41. The signal processing system according to claim 33, further comprising an averaging unit coupled to the second chroma demodulator, averaging samples oft he regulated baseband chrominance signal (U3,V3), wherein the samples are spaced a predetermined number of frames apart.

42. The signal processing system according to claim 33, wherein the spatial correlation is a correlation of the samples spaced at least one of a predetermined number of horizontal and vertical lines apart, and the temporal correlation is a correlation of the samples spaced a predetermined number of frames apart.

43. The signal processing system according to claim 42, wherein the image similarity calculator outputs a small degree of image similarity less than a threshold only if both the spatial and temporal correlations fall below a threshold.

44. A television comprising:
  a receiver operative to receive a composite TV signal; and
  a signal processor operative to process the composite TV signal output from the receiver, comprising:
    an image similarity calculator, operative to calculate image similarity of the composite TV signal, wherein the image similarity is calculated based on spatial and temporal correlations of samples of the composite TV signal;
    a Y/C separator, operative to extract a luminance signal (Y) and a chrominance signal (C) from the composite TV signal;
    a chroma demodulator, operative to demodulate the chrominance signal (C) to obtain a baseband chrominance signal (U1,V1);
    a chroma regulator, operative to regulate the baseband chrominance signal (U1,V1) to obtain a regulated baseband chrominance signal (U2,V2); and
    a chroma mixer, operative to calculate a final chrominance signal (U,V) from the baseband chrominance signal (U1,V1) and the regulated baseband chrominance signal (U2,V2) according to the image similarity.

45. The television according to claim 44, wherein the signal processor further comprises a similarity mapping table operative to output a variation coefficient K to the chroma mixer in accordance with the degree of image similarity calculated by the image similarity calculator, and wherein the chroma mixer calculates the final chrominance signal (U,V) based on the variation coefficient K.

46. The television according to claim 45, wherein the signal processor further comprises means for managing contents of the similarity mapping table.

47. The television according to claim 45, wherein the chroma mixer is operative to calculate the final chrominance signal (U,V) by combining the baseband chrominance signal (U1,V1) and the regulated baseband chrominance signal (U2,V2) with a weighting factor equivalent to the variation coefficient K, as follows:

$$U = K \times U2 + (1-K) \times U1,$$

$$V = K \times V2 + (1-K) \times V1.$$

48. The television according to claim 44, wherein the chroma mixer is operative to output the baseband chrominance signal (U1,V1) as the final chrominance signal (U,V) if image similarity exceeds a preset threshold, else output the regulated baseband chrominance signal (U2,V2) as the final chrominance signal (U,V).

49. The television according to claim 44, wherein the chroma regulator is operative to obtain the regulated baseband chrominance signal (U2,V2) by reducing the amplitude of the baseband chrominance signal (U1,V1) output from the chroma demodulator.

50. The television according to claim 44, wherein the chroma regulator is operative to obtain the regulated baseband chrominance signal (U2,V2) by averaging samples of the baseband chrominance signal (U1,V1) spaced a predetermined number of lines apart.

51. The television according to claim 44, wherein the chroma regulator is operative to obtain the regulated baseband chrominance signal (U2,V2) by averaging samples of the baseband chrominance signal (U1,V1) spaced a predetermined number of frames apart.

52. A television comprising:
 means for receiving a composite TV signal; and
 means for processing the composite TV signal output, comprising:
 means for calculating image similarity of the composite TV signal, wherein the image similarity is calculated based on spatial and temporal correlations of samples of the composite TV signal;
 means for extracting a luminance signal (Y) and a chrominance signal (C) from the composite TV signal;
 means for demodulating the chrominance signal (C) to obtain a baseband chrominance signal (U1,V1);
 means for regulating the chrominance signal (C) to obtain a regulated chrominance signal (C2);
 means for demodulating the regulated chrominance signal (C2) to obtain a regulated baseband chrominance signal (U3,V3); and
 means for calculating a final chrominance signal (U,V) from the baseband chrominance signal (U1,V1) and the regulated baseband chrominance signal (U3,V3) according to the image similarity.

53. The television according to claim 52, wherein the means for processing comprises a similarity mapping table operative to output a variation coefficient K in accordance with the degree of image similarity calculated, and wherein the chrominance calculating means calculates the final chrominance signal (U,V) based on the variation coefficient K.

54. The television according to claim 53, wherein the means for processing further comprises means for managing contents of the similarity mapping table.

* * * * *